United States Patent [19]

Gomi et al.

[11] Patent Number: 5,127,968
[45] Date of Patent: Jul. 7, 1992

[54] ADDITIVE FOR FLUXES AND SOLDERING PASTES

[75] Inventors: Tadashi Gomi, Fussa; Hiroko Ota, Koshigaya; Kazue Kaneko, Tokyo, all of Japan

[73] Assignee: Yuho Chemicals Inc., Tokyo, Japan

[21] Appl. No.: 560,180

[22] Filed: Jul. 31, 1990

[30] Foreign Application Priority Data

Aug. 16, 1989 [JP] Japan .................................. 1-211183
Aug. 23, 1989 [JP] Japan .................................. 1-216613
Dec. 12, 1989 [JP] Japan .................................. 1-321725

[51] Int. Cl.$^5$ ............................................. B23K 35/34
[52] U.S. Cl. ........................................ 148/23; 148/24
[58] Field of Search ....................................... 148/23–25

[56] References Cited

U.S. PATENT DOCUMENTS 4,000,016 12/1976 Lazzarini ................................ 148/23
4,428,780 1/1984 Shedroff ................................ 148/24
4,478,650 10/1984 Zado ..................................... 148/24
4,619,715 10/1986 Hwang .................................. 148/23

*Primary Examiner*—Peter D. Rosenberg
*Attorney, Agent, or Firm*—Burns, Doane, Swecker and Mathis

[57] ABSTRACT

An additive contains a deactivation agent functioning at soldering temperature. This novel additive is used for fluxes and soldering pastes. In the course of soldering, the deactivation agent in the additive deactivates an activator such as organic acids contained in the flux and the soldering paste in order for removal of an oxide film from a metallic base used for electric circuit. By use of the additive, corrosion of the metallic base with the activator is prevented even though the activator remains on the base. The additive enables one to omit an unnecessary washing step from a preparation of electric circuit.

20 Claims, No Drawings

ADDITIVE FOR FLUXES AND SOLDERING PASTES

BACKGROUND OF THE INVENTION

1. Field of the Invention

The present invention relates to an additive for fluxes and soldering pastes, a flux containing the additive and a soldering paste containing the flux. In the field of electronics, fluxes are widely used for the purpose of removal of an oxide film on a metallic base. The flux of the present invention is the novel flux which never corrodes metallic bases even though it remains on the metallic bases after soldering.

2. Description of Prior Art

In a general method for soldering electronic parts on a metallic base (for example, copper base) for electronic circuits, a surface of the base is treated with a flux to remove an oxide film and then the surface is dipped into a melted solder bath. However, this method requires two steps: (1) treatment with the flux and (2) dipping into the solder bath. Further, in this method, some of the electronic parts put on the base have removed occasionally from the base in the course of the steps.

In order to solve these problems, the method using a soldering paste containing a flux and solder particles has been developed. According to the method, the soldering paste is applied on a base by, for example, a dispenser and then heated or irradiated with ultraviolet light to complete soldering. Since the soldering paste is viscous, electronic parts are easily held on the base. However, even the above method has some disadvantages. The soldering paste contains an activator such as organic acids and organic acid salts in order to remove an oxide film on the base perfectly. After soldering, the soldered base has to be washed to remove the activator because the corrosion of the base with the remaining activator continues after completion of the soldering operation.

In general, a solvent of fluorohydrocarbons such as Freon and water are used for this washing. However, the use of fluorohydrocarbons tends to be prohibited because they have harmful effects on the atmospheric environment. Further, if water is used for the washing, the resulting waste water is polluted with heavy metals and cannot be discharged without removal of the metals.

Therefore, an object of the present invention is to provide a soldering paste which contains an activator and does not continue to corrode a base after soldering even though the soldered base is not subjected to a washing step.

Another object of the present invention is to provide a flux which contains an activator and does not continue to corrode a base after soldering even though the flux is contained in a soldering paste and the base soldered with this paste is not subjected to a washing step.

A further object of the present invention is to provide an additive for a flux and a soldering paste containing an activator, which is contained in the flux and the soldering paste and deactivates the activator in the course of soldering.

SUMMARY OF THE INVENTION

The present invention relates to an additive for fluxes and soldering pastes which have an organic acid or an organic acid salt wherein the additive comprises one or more deactivation agents which react with the organic acid or the organic acid salt in the course of soldering.

Further the present invention relates to a flux comprising an organic acid or organic acid salt wherein the flux further comprises one or more deactivation agents which react with the organic acid or the organic acid salt in the course of soldering.

In addition, the present invention relates to a soldering paste comprising the above-mentioned flux and solder particles.

DETAILED DESCRIPTION OF THE INVENTION

The present invention will now be explained in detail below.

A flux and a soldering paste, according to the invention, contain an organic acid or an organic acid salt as the activator which removes an oxide film on a metallic base.

The present invention utilizes the reaction of the organic acid or the organic acid salt with a deactivation agent in the course of soldering. The deactivation agent used in the present invention does not function at ordinary temperature but functions in the vicinity of soldering temperature. That is, the deactivation agent is selected from the compounds which do not react with the acid or the salt at ordinary temperature but react at a temperature in the vicinity of soldering temperature.

The deactivation agent is preferably selected from the group consisting of blocked isocyanates, polyvalent metal compounds and epoxy resins.

The "blocked isocyanate" is a compound represented by the formula RNHCOB and obtained by reacting an NCO group of an isocyanate compound (R-NCO) with a volatile active hydrogen compound (HB) used as a blocking agent. The blocked isocyanate is inactive to the activator such as organic acids at ordinary temperature and exhibits reactivity to the activator at an elevated temperature because the blocked isocyanate is decomposed at an elevated temperature and produces the isocyanate compound (R-NCO) reactive to the activator.

The blocked isocyanate used is determined by taking account of the melting point of the solder particles used and the soldering temperature applied. The decomposition temperature of the blocked isocyanate has to be lower than the soldering temperature. The decomposition temperature suitably ranges from about 50° to 350° C., preferably in the vicinity of the melting point of the solder particles, for example from about 150° to 250° C. Examples of the active hydrogen compound used as the blocking agent include alcohols, phenols, $\epsilon$-caprolactam, oximes and active methylene compounds. It is provided that the active hydrogen compound is not limited to these compounds.

The blocked isocyanates are classified into two groups, monomers and polymers, and both of blocked isocyanates are usable in the present invention.

It is possible to add various catalysts to the additive in order to control reactivity of the blocked isocyanate. Examples of the catalysts include N-methylmorpholine.

An adding amount of the catalyst to the additive may be determined on the basis of the type and the amount of the blocked isocyanate and the type Of the catalyst. For instance, in the case that an HDI (hexamethylenediisocyanate) type isocyanate using phenol as the blocking agent is used as the blocked isocyanate and N-methylmorpholine is used as the catalyst, 0.001 to 1 parts by weight of the catalyst is suitably used with respect to 100 parts by weight of the blocked isocyanate.

The "polyvalent metal compound" is a compound forming a salt with the organic acid or the organic acid salt in the course of soldering. The polyvalent metal compounds used in the present invention are the compounds inactive to the activator such as organic acids at ordinary temperature and exhibiting reactivity to the activator at an elevated temperature. That is, the polyvalent metal compounds used as the deactivation agent are the compounds which are decomposed at an elevated temperature and produce salts with the activator such as the organic acid and the organic acid salt.

The polyvalent metal compound used is determined by taking account of the melting point of the solder particles used and the soldering temperature applied. The decomposition temperature of the polyvalent metal compound has to be lower than the soldering temperature. The decomposition temperature ranges from about 50° to 350° C., preferably in the vicinity of the melting point of the solder particles, for example from about 150° to 250° C.

Polyvalent metal complexes are exemplified as the polyvalent metal compound. Any metal with 2 or more of valences can be used as the polyvalent metals contained in the polyvalent metal complex. Examples of the polyvalent metals include beryllium, cadmium, copper, calcium, magnesium, zinc, zirconium, barium, strontium, aluminum, bismuth, antimony, lead, cobalt, iron, nickel and titanium.

Examples of the ligands for formation of the polyvalent metal complexes include formic acid, acetic acid, propionic acid, butylic acid, valeric acid, oxalic acid, malonic acid, succinic acid, glutaric acid, maleic acid, fumalic acid, citraconic acid, itaconic acid, glycollic acid, malic acid, tartaric acid, lactic acid, citric acid, diglycollic acid, benzoic acid, salicylic acid, ethylenediamine, iminodiacetic acid, nitrilotriacetic acid, ethylenediaminetetraacetic acid, glycine, sarcosine, alanine, octanediol, hexanediol, acetylacetone, methylacetoacetate, ethylacetoacetate, diacetone alcohol, diethyltriamine, triethylenetetramine, triaminotriethylamine, pentaethylenehexamine, N-hydroxyethylethylenediamine, N,N'-dihydroxyethylethylenediamine, triethanolamine, N,N'-dimethylethylenediamine, N,N'-tetramethylethylenediamine, 1,3-diaminopropane, 1,2-diaminopropane, pyridine, dipyridyl, terpyridyl, N-dihydroxyethylglycine, N-hydroxyethyliminoacetic acid, N,N'-ethylenediaminediacetic acid, N-hydroxyethylethylenediaminetetraacetic acid, diethylenetriaminepentaacetic acid,1,2-cyclohexanediaminetetraacetic acid, trimethylenediaminetetraacetic acid, ethyleneglycoldiethyletherdiaminetetraacetic acid, ethyldiaminetetrapropionic acid, $\beta$-aminoethylphoshoric acid N,N-diacetic acid, aminomethylphoshoric acid N,N-diacetic acid, ascorbic acid, thioglycolic acid, 2,3-dimercaptopropanol, thiourea, sodium diethyldithiocarbamate, 8-oxine, acetylacetone, phenanthrene, aspartic acid, dimethylglyoxime, glyoxal-bis, thenoyltrifluoroacetone, carbonic acid, ammonia and amine.

Examples of the polyvalent metal complexes include titanium acetylacetate, dipyridyl copper, acetylacetone cobalt, bis(dimethylglyxymate) nickel, titanium octylglycolate, titnium lactate and titanium lactate ethylester.

In the present invention, epoxy resins having an epoxy group inactive to the activator at ordinary temperature and exhibiting reactivity to the activator at an elevated temperature are usable as the epoxy resin. The epoxy resin used is determined by taking account of the melting point of the solder particles used and the soldering temperature applied. The reaction starting temperature of the epoxy resin with the activator has to be lower than the soldering temperature. The reaction temperature suitably ranges from about 50° to 350° C., preferably in the vicinity of the melting point of the solder particles, for example from about 150° to 250° C.

It is provided that epoxy resins having two or more epoxy groups in a molecule are particularly preferred from the viewpoint that they make polymers by cross linkage reaction with the activator.

Examples of types of the epoxy resin include bisphenol A type, halogenated bisphenol type, bisphenol F type, resorcin type, tetrahydoxyphenolethane type, novolak type, polyalcohol type, polyglycol type, glycerin triether type, polyolefin type, epoxy soyabean oil and alicyclic type. In particular, it is preferred to use bisphenol A type, halogenated bisphenol type, bisphenol F type and resorcin type epoxy resins.

It is possible to add various catalysts to the additive, the flux and the soldering paste in order to control reactivity of the epoxy resin. Examples of the catalyst include diethylenetriamine, ethylenediamine and the like.

An adding amount of the catalyst may be determined on the basis of the type and the amount of the epoxy resin and the type of the catalyst. For instance, in the case that bisphenol A is used as the epoxy resin and diethylenetriamine is used as the catalyst, about 10 to 15 parts by weight of the catalyst is suitably used with respect to 100 parts by weight of the epoxy resin.

The concentration of the deactivation agent in the additive of the present invention is not limited but preferably ranges, for example, between about 50 and 100 wt% based on the weight of the additive.

The additive of the present invention may further comprise a solvent. Any solvent dissolving the deactivation agent is usable without limitation. It is provided that the use of the solvent with a boiling point lower than the melting point of soldering particles is preferred. The soldering temperature has to be relatively higher than the melting point of the soldering particles. If the solvent with a boiling point higher than a melting point is used, it is possible to deteriorate the properties of the obtained electronic circuit.

In particular, with respect to solvents with a carboxyl group or a hydroxyl group, a boiling point of the solvent is preferably lower than the decomposition temperature or the reaction starting temperature of the deactivation agent from the viewpoint of facility of reaction between the deactivation agent and the activator. That is, the boiling point of the solvent is preferably lower than the decomposition temperature of the blocked isocyanate and the polyvalent metal compound, and the boiling point of the solvent is preferably lower than the reaction starting temperature of the epoxy resin with the activator.

Examples of the solvents include aliphatic compound (n-hexane (b.p. 68.7)(hereinafter, the number in parentheses is the boiling point), isohexane (60–64), n-heptane (98.4)), esters (isopropyl acetate (89.0), methyl propionate (79.7), ethyl propionate (99.1)), ketones (methylethylketone (79.6), methyl-n-propylketone (103.3), diethylketone (102.2)), alcohols (ethanol (78.3), n- propanol (97.2), isopropanol (82. 3), isobutanol (107.9), and secondary butanol (99.5)).

The flux of the present invention will now be explained. The flux of the present invention contains the above-mentioned deactivation agent and an activator such as organic acids and organic acid salts and if necessary the catalyst for the deactivation agent and a solvent.

The organic acid and the Organic acid salt act as the activator. The activator in the flux acts to remove an oxide film on the base at ordinary temperature as the soldering paste containing the flux is applied on a metallic base.

Examples of the organic acid include monocarboxylic acids (formic acid, acetic acid, propionic acid, capronic acid, enanthic acid, caprilic acid, pelargonic acid, capric acid, undecanoic acid, lauric acid, myristic acid, palmitic acid, stearic acid), dicarboxylic acids (oxalic acid, malonic acid, succinic acid, glutaric acid, adipic acid, pimelic acid, suberic acid, azelaic acid, sebacic acid), oxycarboxylic acids (oxysuccinic acid, citric acid tartaric acid, hydroxyacetic acid, salicylic acid, (m-, p-) hydroxybenzoic acid, 12-hydroxydodecanoic acid, 12-isobutyric acid, (o-, m-, p-) hydroxyphenylacetic acid, 4-hydroxyphthalic acid, 12-hydroxystearic acid) and the like.

Examples of the organic acid salt include salts of the above-mentioned organic acid with an amine (for example, diethylaminoethanol), ammonia and an alkali metal (for instance, sodium, potassium and the like).

The flux of the present invention may also contain the above-mentioned solvent.

The content of the blocked isocyanate as compound to the content of the organic acid or the organic acid salt (or a mixture thereof) in the flux is expressed in the molar ratio of NCO groups in the blocked isocyanate against COOH groups contained in the organic acid or the organic acid salt and suitably ranges from 1:0.5-3, preferably 1:0.5-1.5 from the viewpoint of effective prevention of a metallic base from corroding.

It is suitable that the content of the organic acid, the organic acid salt, the blocked isocyanate and the solvent in the flux of the present invention are as follows: organic acid or organic acid salt: 0.1-30 parts by weight, blocked isocyanate: 0.1-50 parts by weight, solvent: 20-99.8 parts by weight.

The content of the polyvalent metal compound to the content of the organic acid or the organic acid salt (or a mixture thereof) in the flux is expressed in the equivalent ratio of polyvalent metal of the polyvalent metal compound against COOH groups contained in the organic acid or the organic acid salt and suitably ranges from 1:0.05-5, preferably 1: 0.5-2 from the viewpoint of effective prevention of a metallic base from corroding.

It is suitable that the content of the organic acid, the organic acid salt, the polyvalent metal compound and the solvent in the flux of the present invention are as follows: organic acid or organic acid salt: 0.1-50 parts by weight, polyvalent metal compound: 0.05-40 parts by weight, solvent: 10-99.85 parts by, weight.

The content of the epoxy resin as compared to the content of the organic acid or the organic acid salt (or a mixture thereof) in the flux is expressed in the molar ratio of epoxy groups in the epoxy resin against COOH groups contained in the organic acid or the organic acid salt and suitably ranges from 1:0.05-10, preferably 1:0.5-5 from the viewpoint of effective prevention of a metallic base from corroding.

It is suitable that the content of the organic acid, the organic acid salt, the epoxy resin and the solvent in the flux of the present invention are as follows, organic acid or organic acid salt: 0.1-30 parts by weight, epoxy resin: 0.1-90 parts by weight, solvent: 10-99.8 parts by weight.

The flux of the present invention may contain a rosin in addition to the components such as the organic acid and the like various rosins may be used as the rosin. Rosin modified with maleic acid, rosin ester modified with moleic acid, hydrogenated rosin, disproportionated rosin, polymerized rosin, gum rosin, wood rosin, tall oil rosin and the like are exemplified. Especially, taking into consideration the corrosiveness of solder, the use of esterified rosin such as rosin ester modified with maleic acid is preferred.

The main component of the rosin is abietic acid or abietic acid type compounds such as isomers or polymers of abietic acid. Abietic acid and abietic acid type compounds do not exhibit activity at ordinary temperature, and under heating at 90° C. or more, they melt and exhibit activity to remove an oxide film on a metallic base. Thus they are not corrosive in storage at ordinary temperature.

Therefore, in the present invention, any rosin containing abietic acid or abietic acid type compounds is usable.

The content of rosin may range, for example, from 10 to 10000 parts by weight based on 100 parts by weight of the organic acid or the organic acid salt.

The soldering paste of the present invention contains solder particles in addition to the above-mentioned flux. The "solder particles" used herein include not only tin-lead alloys generally known as the solder but also alloys further containing silver, bismuth, gold, iridium and the like.

The shape of the solder particles is not limited. The particle size suitably ranges from 10 to 1000 mesh, preferably from 250 to 400 mesh.

The weight ratio of the solder particles to the flux is not limited but it is preferred that the amount of the solder particles ranges from 40 to 95 parts by weight and that of the flux ranges from 5 to 60 parts by weight.

The soldering paste of the, present invention may further contain a thixotropic thickener and the content of the thickener may be between 0.1 and 20 weight %, preferably between 1 and 15 weight % of the paste.

The present invention will be illustrated in more detail with reference to the following Examples.

EXAMPLES

Example 1 (Flux composition)

An organic acid (or an organic acid salt), a rosin, an activator and a solvent are added to a preparation vessel with an agitation apparatus and stirred to dissolve perfectly all components. After dissolution of the materials, an additive is added to obtain a flux composition. The charging amounts of each component are listed in Table 1.

The spread factor and corrosiveness of the resulting flux compositions are estimated. The spread factor is measured according to U.S. Standard QQ-S-571E. The corrosiveness is measured based on JIS-Z-3197 6.6. The results are shown in Table 3.

TABLE 1

| Component | Present Invention | | | | | | | | | | Comparative Example | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Organic acid and organic acid salt | | | | | | | | | | | | | | | |
| Formic acid | 2.00 | | | | | | | | | | 2.00 | | | | |
| Acetic acid | | 1.00 | | | | | | | | | | 1.00 | | | |
| Maloic acid | | | 1.50 | | | | | | | | | | 1.50 | | |
| Succinic acid | | | | 1.00 | | | | 6.00 | | | | | | 1.00 | |
| Glutaric acid | | | | | 0.50 | 2.00 | | | | | | | | | |
| Azelic acid | | 4.00 | | | | | 0.50 | | | 5.00 | | 4.00 | | | |
| Sebacic acid | 6.00 | | | | | | 0.50 | | 2.80 | | 6.00 | | | | |
| Ammonium oleate | | | | | | | | 2.00 | | | | | | | |
| Rosin | | | | | | | | | | | | | | | |
| WW rosin* | | | | | 15.00 | | | | | | | | | | 15.00 |
| Hydrogenated rosin | | | | | | 10.00 | | | | | | | | | |
| Activator | | | | | | | | | | | | | | | |
| Diethylamine hydrochlorate | | | | | | | | | | | | | | | 0.25 |
| Ethylamine bromate | | | | | | | | | | | | | | | 0.25 |
| Solvent | | | | | | | | | | | | | | | |
| Isopropyl alcohol | 65.20 | 33.67 | 74.28 | | | | 50.00 | | 67.97 | | 92.00 | 47.50 | 98.50 | | |
| Dimethylcarbitol | | 33.66 | | 84.77 | | | | 72.96 | | | | 47.50 | | 99.00 | |
| n-hexane | | | | | 79.09 | | 21.78 | | | 37.22 | | | | | 84.50 |
| Diethylketone | | | | | | 70.49 | | | | 37.22 | | | | | |
| Additive | | | | | | | | | | | | | | | |
| OLESTER NP-1060PB | 26.80 | | | 1.71 | | | | | | | | | | | |
| EPOKEY PER-170 | | 27.67 | | 3.70 | 14.79 | | | | | | | | | | |
| OLESTER PB3537 | | | 24.22 | | 12.72 | 8.92 | | | | | | | | | |
| OLESTER XQ5095PB | | | | 14.23 | | 8.30 | | | | | | | | | |
| CORONATE 2507 | | | | | | | | 19.04 | | 9.62 | | | | | |
| CORONATE 2513 | | | | | | | | | 27.23 | 10.94 | | | | | |

*Water white rosin
Additives (Blocked isocyanate)
OLESTER NP-1060PB: Mitsui Toatsu Chemicals Inc.
EPOKEY EPR-170: Mitsui Toatsu Chemicals Inc.
OLESTER PB3537: Mitsui Toatsu Chemicals Inc.
OLESTER XQ5095PB: Mitsui Toatsu Chemicals Inc.
CORONATE 2507: Nippon Polyurethane Industry Inc.
CORONATE 2513: Nippon Polyurethane Industry Inc.

TABLE 2

| Additive | Average Molecular Weight | Effective NCO % | Nonvolatile matter % |
|---|---|---|---|
| OLESTER NP-1060PB | 1200 | 9.3 | 60 |
| EPOKEY EPR-170 | 1350 | 4.3 | 70 |
| OLESTER PB3537 | 1400 | 5.0 | 60 |
| OLESTER XQ5095PB | 1300 | 5.0 | 55 |
| CORONATE 2507 | 800 | 11.6 | 80 |
| CORONATE 2513 | 800 | 10.2 | 80 |

TABLE 3

| Flux | Spread factor | Corrosiveness |
|---|---|---|
| Composition of Present Invention | | |
| 1 | 80 | Ex |
| 2 | 81 | Ex |
| 3 | 74 | Ex |
| 4 | 72 | Ex |
| 5 | 75 | Ex-P(F) |
| 6 | 83 | Ex |
| 7 | 80 | Ex |
| 8 | 75 | Ex |
| 9 | 78 | Ex |
| 10 | 81 | Ex |
| Comparative Example | | |
| 11 | 81 | P(C) |
| 12 | 81 | P(C) |
| 13 | 77 | P(A) |
| 14 | 75 | P(B) |
| 15 | 77 | P(C) |

Estimation of Corrosiveness
Ex: Suitable flux (Deposited copper or plated copper is not corroded with flux.)
P: Unsuitable flux
A: Copper under flux is corroded and disappeared.
B: Copper under the edge of flux is corroded and disappeared.
C: Copper under the center of flux is corroded and disappeared.
D: The edge of flux is discolored because of corrosion and looks like an umbrella.
E: The center of flux is discolored because of corrosion.
F: The edge of flux looks opaque dark brown.

Example 2 (Soldering paste)

A thixotropic thickener is added to the flux composition obtained in Example 1 by use of an ink mixer (high viscosity mixer) to dissolve completely. Then solder particles are added to the dissolved flux composition and agitated until a uniform soldering paste is obtained. The flux composition and the amount of solder particles are shown in Table 4.

The spread factor, formation of solder balls and corrosiveness of the resulting flux compositions are estimated. The spread factor is measured according to U.S. Standard QQ-S-571E. The solder ball test is conducted according to U.S. Standard ANSI/IPC-SP-819. The corrosiveness is measured based on JIS-Z-3197 6.6. The results are shown in Table 5.

TABLE 4

| | Present Invention | | | | | Comp. Example | |
|---|---|---|---|---|---|---|---|
| | 1 | 2 | 3 | 4 | 5 | 6 | 7 |
| Solder | | | | | | | |

TABLE 4-continued

| | Present Invention | | | | | Comp. Example | |
|---|---|---|---|---|---|---|---|
| | 1 | 2 | 3 | 4 | 5 | 6 | 7 |
| particles | | | | | | | |
| A | 50.00 | | | 60.00 | 20.00 | 50.00 | 60.00 |
| B | | 60.00 | | 20.00 | | | 20.00 |
| C | | | 70.00 | | 70.00 | | |
| Flux | | | | | | | |
| 1 | 40.00 | | | 5.00 | | | |
| 2 | | 35.00 | | 13.00 | 8.50 | | 15.00 |
| 3 | | | 27.00 | | | | |
| 11 | | | | | | 40.00 | |
| 15 | | | | | | | |
| Hardened castor oil | 10.00 | 5.00 | 3.00 | 2.00 | 1.50 | 10.00 | 5.00 |

Hardened castor oil: thixotropic thickener

| | Composition | Shape | |
|---|---|---|---|
| Solder particles | | | |
| A | Sn/Pb (60/40) | Sphere | 50–150 mesh |
| B | Sn/Pb/Bi (55/40/5) | Nonsphere | 100–250 mesh |
| C | Sn/Pb/Ag (60/38/2) | Sphere | 100–250 mesh (60%) |
| | | Nonsphere | 50–150 mesh (40%) |

TABLE 5

| Soldering Paste | Spread factor | Solder ball test | Corresiveness |
|---|---|---|---|
| Present Invention | | | |
| 1 | 83 | A | Ex |
| 2 | 84 | A | Ex |
| 3 | 76 | A | Ex |
| 4 | 81 | A | Ex |
| 5 | 78 | B | Ex |
| Comparative Example | | | |
| 6 | 81 | A | P(C) |
| 7 | 80 | A | P(C) |

Estimation of solder ball test
A: Preferred
B: Acceptable
C: Unacceptable
Estimation of Corrosiveness
Ex: Suitable flux (Deposited copper or plated copper is not corroded with flux.)
P: Unsuitable flux
A: Copper under flux is corroded and disappeared.
B: Copper under the edge of flux is corroded and disappeared.
C: Copper under the center of flux is corroded and disappeared.
D: The edge of flux is discolored because of corrosion and looks like an umbrella.
E: The center of flux is discolored because of corrosion.
F: The edge of flux looks opaque dark brown.

Example 3 (Flux composition)

An organic acid (or an organic acid salt), a rosin, an activator and a solvent are added to a preparation vessel with an agitation apparatus and stirred to dissolve perfectly all components. After dissolution of the materials, an additive is added to obtain a flux composition. The charging amounts of each component are listed in Table 6.

The spread factor and corrosiveness of the resulting flux compositions are estimated. The spread factor is measured according to U.S. Standard QQ-S-571E. The corrosiveness is measured based on JIS-Z-3197 6.6. The results are shown in Table 7.

TABLE 6

| Component | Present Invention | | | | | | | | | | Comparative Example | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Organic acid and organic acid salt | | | | | | | | | | | | | | | |
| Formic acid | 2.00 | | | | | | | | | | 2.00 | | | | |
| Acetic acid | | 1.00 | | | | | | | | | | 1.00 | | | |
| Maloic acid | | | 1.50 | | | | | | 2.00 | | | | 1.50 | | |
| Succinic acid | | | | 1.00 | | | | 6.00 | | | | | | 1.00 | |
| Glutaric acid | | | | | 0.50 | 2.00 | | | | | | | | | |
| Azelic acid | | 4.00 | | | | | 0.50 | | | 5.00 | | 4.00 | | | |
| Sebacic acid | 6.00 | | | | | | 0.50 | | 2.80 | | 6.00 | | | | |
| Ammonium oleate | | | | | | | | 2.00 | | | | | | | |
| Rosin | | | | | | | | | | | | | | | |
| WW rosin* | | | | | | 15.00 | | | | | | | | | 15.00 |
| Hydrogenated rosin | | | | | | | | 10.00 | | | | | | | |
| Activator | | | | | | | | | | | | | | | |
| Diethylamine hydrochlorate | | | | | | | | | | | | | | | 0.25 |
| Ethylamine bromate | | | | | | | | | | | | | | | 0.25 |
| Solvent | | | | | | | | | | | | | | | |
| Isopropyl alcohol | 73.38 | | | 48.87 | 82.81 | 96.43 | | | | 90.11 | 92.00 | | | 49.50 | 84.50 |
| Butyl carbitol | | | 95.69 | 48.87 | | | | 31.96 | | | | | 98.50 | 49.50 | |
| n-hexane | | | | | | | 84.63 | 31.95 | | | | | | | |
| Water | | 82.00 | | | | | | | 93.23 | | | 95.00 | | | |
| Additive | | | | | | | | | | | | | | | |
| Titanium octylglycolate | 18.62 | | | | 1.05 | | | 13.14 | | 2.60 | | | | | |
| Ammonium titanium lactate | | 13.00 | | | 0.64 | 0.67 | | | 2.31 | | | | | | |
| Acetylacetone cobalt | | | 2.81 | | | 0.90 | 2.10 | 14.95 | | | | | | | |
| Glycine copper | | | | 1.26 | | | 2.27 | | 1.66 | 2.29 | | | | | |

*Water white rosin

TABLE 7

| Flux | Spread factor | Corrosiveness |
|---|---|---|
| Composition of Present Invention | | |
| 1 | 81 | Ex |

TABLE 7-continued

| Flux | Spread factor | Corrosiveness |
|---|---|---|
| 2 | 80 | Ex |
| 3 | 78 | Ex |
| 4 | 75 | Ex |
| 5 | 73 | Ex-P(F) |
| 6 | 83 | Ex |
| 7 | 78 | Ex |
| 8 | 75 | Ex |
| 9 | 80 | Ex |
| 10 | 79 | Ex |
| Comparative Example | | |
| 11 | 80 | P(C) |
| 12 | 78 | P(C) |
| 13 | 78 | P(A) |
| 14 | 74 | P(A) |
| 15 | 77 | P(D) |

The corrosiveness is shown by the same categories as those used in Example 1.

Example 4 (Soldering paste)

A thixotropic thickener is added to the flux composition obtained in Example 3 by use of an ink mixer (high viscosity mixer) to dissolve completely. Then solder particles are added to the dissolved flux composition and agitated until a uniform soldering paste is obtained. The flux composition and the amount of solder particles are shown in Table 8.

The spread factor, formation of solder balls and corrosiveness of the resulting flux compositions are estimated. The spread factor is measured according to U.S. Standard QQ-S-571E. The solder ball test is conducted according to U.S. Standard ANSI/IPC-SP-819. The corrosiveness is measured based on JIS-Z-3197 6.6. The results are shown in Table 9.

TABLE 8

| | Present Invention | | | | | Comp. Example | |
|---|---|---|---|---|---|---|---|
| | 1 | 2 | 3 | 4 | 5 | 6 | 7 |
| Solder particles | | | | | | | |
| A | 50.00 | | | 60.00 | 20.00 | 50.00 | 60.00 |
| B | | 60.00 | | 20.00 | | | 20.00 |
| C | | | 70.00 | | 70.00 | | |
| Flux | | | | | | | |
| 1 | 40.00 | | | 5.00 | | | |
| 2 | | 38.50 | | 13.00 | 8.50 | | |
| 3 | | | 27.00 | | | | |
| 11 | | | | | | 40.00 | |
| 15 | | | | | | | 17.00 |
| Thixotropic | | | | | | | |

TABLE 8-continued

| | Present Invention | | | | | Comp. Example | |
|---|---|---|---|---|---|---|---|
| | 1 | 2 | 3 | 4 | 5 | 6 | 7 |
| thickener: | | | | | | | |
| Hardened castor oil | 10.00 | | 3.00 | | 1.50 | 10.00 | |
| Kelzan* | | 1.50 | | 2.00 | | | 3.00 |

*Kelzan: Manufactured by Kelco Inc. in USA
Composition: xanthanegum of polysaccharide

| Solder particles | Composition | Shape | |
|---|---|---|---|
| A | Sn/Pb (60/40) | Sphere | 50-150 mesh |
| B | Sn/Pb/Bi (55/40/5) | Nonsphere | 100-250 mesh |
| C | Sn/Pb/Ag (60/38/2) | Sphere | 100-250 mesh (60%) |
| | | Nonsphere | 50-150 mesh (40%) |

TABLE 9

| Soldering Paste | Spread factor | Solder ball test | Corresiveness |
|---|---|---|---|
| Present Invention | | | |
| 1 | 83 | A | Ex |
| 2 | 82 | A | Ex |
| 3 | 77 | A | Ex |
| 4 | 80 | A | Ex |
| 5 | 75 | B | Ex |
| Comparative Example | | | |
| 6 | 82 | A | P(C) |
| 7 | 80 | A | P(C) |

The solder ball test and the corrosiveness are shown by the same categories as those used in Example 2.

Example 5 (Flux composition)

An organic acid (or an organic acid salt), a rosin an activator and a solvent are added to a preparation vessel with an agitation apparatus and stirred to dissolve perfectly all components. After dissolution of the materials, an additive is added to obtain a flux composition. The charging amounts of each component are listed in Table 10.

The spread factor and corrosiveness of the resulting flux compositions are estimated. The spread factor is measured according to U.S. Standard QQ-S-571E. The corrosiveness is measured based on JIS-Z-3197 6.6. The results are shown in Table 12.

TABLE 10

| Component | Present Invention | | | | | | | | | | Comparative Example | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Organic acid and organic acid salt | | | | | | | | | | | | | | | |
| Formic acid | 2.00 | | | | | | | | | | 2.00 | | | | |
| Acetic acid | | 1.00 | | | | | | | | | | 1.00 | | | |
| Maloic acid | | | 15.00 | | | | | | | | | | 15.00 | | |
| Succinic acid | | | | 10.00 | | | | 6.00 | | | | | | 10.00 | |
| Glutaric acid | | | | | 0.50 | 20.00 | | | | | | | | | |
| Azelic acid | | 4.00 | | | | | | 0.50 | | 5.00 | 4.00 | | | | |
| Sebacic acid | 6.00 | | | | | | | 0.50 | | | 6.00 | | | | |
| Ammonium oleate | | | | | | | | 2.00 | | | | | | | |
| Rosin | | | | | | | | | | | | | | | |
| WW rosin* | | | | | 15.00 | | | | | | | | | | 15.00 |
| Hydrogenated rosin | | | | | | | 10.00 | | | | | | | | |
| Activator | | | | | | | | | | | | | | | |
| Diethylamine hydrochlorate | | | | | | | | | 0.25 | | | | | | 0.25 |
| Ethylamine bromate | | | | | 0.15 | | | | | | | | | | 0.25 |

TABLE 10-continued

| Component | Present Invention | | | | | | | | | | Comparative Example | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Solvent | | | | | | | | | | | | | | | |
| Isopropyl alcohol | 72.98 | 84.94 | | 10.00 | | 14.16 | | 40.00 | 85.93 | 59.86 | 92.00 | | | 50.00 | 84.50 |
| Butyl carbitol | | | 2.93 | | 81.51 | | 86.49 | 13.01 | | 10.00 | | 95.00 | 50.00 | 40.00 | |
| n-hexane | | | 10.00 | 12.26 | | | | | | 10.00 | | | 35.00 | | |
| Additive | | | | | | | | | | | | | | | |
| EPICLON 840 | 19.02 | | | | | 28.00 | | | 3.56 | | | | | | |
| EPICLON 830S | | 10.06 | | | | | 0.87 | | | | | | | | |
| EPICLON 860-90X | | | 72.07 | | | 37.84 | | | | 6.64 | | | | | |
| EPICLON 153-60T | | | | 67.74 | | | | | 21.66 | | | | | | |
| EPICLON 707 | | | | | 1.21 | | | 17.33 | | 8.50 | | | | | |
| EPICLON 430 | | | | | 1.63 | | 1.64 | | 8.26 | | | | | | |

*Water white rosin
Additives (Epoxy resin)
EPICLON 840: Manufactured by Dainippon Ink Chemical Industry Inc., Bisphenol A type
EPICLON 830S: Manufactured by Dainippon Ink Chemical Industry Inc., Bisphenol F type
EPICLON 860-90X: Manufactured by Dainippon Ink Chemical Industry Inc., Solvent diluted type
EPICLON 153-60T: Manufactured by Dainippon Ink Chemical Industry Inc., Flame-retardant type
EPICLON 707: Manufactured by Dainippon Ink Chemical Industry Inc., polyalcohol ether type
EPICLON 430: Manufactured by Dainippon Ink Chemical Industry Inc., polyglycidyl type

TABLE 11

| Additive | Epoxy Equivalent | Non-volatile matter % | Viscosity (25° C.) |
|---|---|---|---|
| EPICLON 840 | 180–190 | 100 | 9000–11000 CPS |
| EPICLON 830S | 180–190 | 100 | 3000–4500 CPS |
| EPICLON 860-90X | 165–185 | 90 | $Z_3$–$Z_6$ (GARDNER) |
| EPICLON 153-60T | 390–410 | 100 | Less than A (GARDNER) |
| EPICLON 707 | 300–340 | 100 | 50–100 CPS |
| EPICLON 430 | 110–130 | 100 | 8000–14000 CPS |

TABLE 12

| Flux | Spread factor | Corrosiveness |
|---|---|---|
| Composition of Present Invention | | |
| 1 | 78 | Ex |
| 2 | 78 | Ex |
| 3 | 87 | Ex |
| 4 | 82 | Ex |
| 5 | 80 | Ex–P(C) |
| 6 | 85 | Ex |
| 7 | 78 | Ex |
| 8 | 81 | Ex |
| 9 | 78 | Ex |
| 10 | 80 | Ex |
| Comparative Example | | |
| 11 | 78 | P(C) |
| 12 | 78 | P(D) |
| 13 | 86 | P(F) |
| 14 | 80 | P(F) |
| 15 | 80 | P(B) |

The corrosiveness is shown by the same categories as those used in Example 1.

Example 6 (Soldering paste)

A thixotropic thickener is added to the flux composition obtained in Example 5 by use of an ink mixer (high viscosity mixer) to dissolve completely. Then solder particles are added to the dissolved flux composition and agitated until a uniform soldering paste is obtained. The flux composition and the amount of solder particles are shown in Table 13.

The spread factor, formation of solder balls and corrosiveness of the resulting flux compositions are estimated. The spread factor measured according to U.S. Standard QQ-S-571E. The solder ball test is conducted according to U.S. Standard ANSI/IPC-SP-819. The corrosiveness is measured based on JIS-Z-3197 6.6. The results are shown in Table 14.

TABLE 13

| | Present Invention | | | | | Comp. Example | |
|---|---|---|---|---|---|---|---|
| | 1 | 2 | 3 | 4 | 5 | 6 | 7 |
| Solder particles | | | | | | | |
| A | 50.00 | | | 60.00 | 20.00 | 50.00 | 60.00 |
| B | | 60.00 | | 20.00 | | | 20.00 |
| C | | | 70.00 | | 70.00 | | |
| Flux | | | | | | | |
| 1 | 40.00 | | | 5.00 | | | |
| 2 | | 38.50 | | 13.00 | 8.50 | | |
| 3 | | | 27.00 | | | | |
| 11 | | | | | | 40.00 | |
| 15 | | | | | | | 17.00 |
| Thixotropic thickener: | | | | | | | |
| Hardened castor oil | 10.00 | | 3.00 | | 1.50 | 10.00 | |
| Kelsan | | 1.50 | | 2.00 | | | 3.00 |

Kelsan: Manufactured by Kelco Inc. in USA
Composition: Xanthane gum of polysaccharide

| Solder particles | Composition | Shape | |
|---|---|---|---|
| A | Sn/Pb (60/40) | Sphere | 50–150 mesh |
| B | Sn/Pb/Bi (55/40/5) | Nonsphere | 100–250 mesh |
| C | Sn/Pb/Ag (60/38/2) | Sphere | 100–250 mesh (60%) |
| | | Nonsphere | 50–150 mesh (40%) |

TABLE 5

| Soldering Paste | Spread factor | Solder ball test | Corrosiveness |
|---|---|---|---|
| Present Invention | | | |
| 1 | 80 | B | Ex |
| 2 | 78 | A | Ex |
| 3 | 82 | A | Ex |
| 4 | 76 | A | Ex |
| 5 | 74 | A | Ex |
| Comparative Example | | | |
| 6 | 80 | B | P(E) |
| 7 | 76 | A | P(C) |

The solder ball test and the corrosiveness are shown by the same categories as those used in Example 2.

We claim:

1. An additive for fluxes and soldering pastes containing an organic acid or an organic acid salt comprising one or more deactivation agents which react with the organic acid or the organic acid salt in the course of soldering.

2. The additive of claim 1 wherein the deactivation agent is selected from blocked isocyanates.

3. The additive of claim 1 wherein the deactivation agent is selected from polyvalent metal compounds forming salts with the organic acid or the organic acid salt in the course of soldering.

4. The additive of claim 1 wherein the deactivation agent is selected from epoxy resins.

5. The additive of claim 1 wherein the additive further comprises a solvent with a boiling point lower than the melting point of solder.

6. A flux comprising an organic acid or an organic acid salt and one or more deactivation agents which react with said organic acid or said organic acid salt in the course of soldering.

7. A flux of claim 6 wherein the deactivation agent is selected from blocked isocyanates.

8. The flux of claim 7 wherein the molar ratio of COOH groups in the organic acid or in the organic acid salt to the NCO groups in the blocked isocyanate, ranges from 1:0.05 to 3.

9. The flux of claim 6 wherein the deactivation agent is selected from polyvalent metal compounds which form salts with the organic acid or the organic acid salt in the course of soldering.

10. A flux of claim 9 wherein the equivalent ratio of COOH groups in the organic acid or in the organic acid salt to the polyvalent metals of the polyvalent metal compound, ranges from 1:05 to 5.

11. A flux of claim 6 wherein the deactivation agent is selected from epoxy resins.

12. The flux of claim 11 wherein the molar ratio of COOH groups in the organic acid or in the organic acid salt to the epoxy groups in the epoxy resin, ranges from 1:0.05 to 10.

13. A flux of claim 6 wherein the flux further comprises a solvent with a boiling point lower than the melting point of solder.

14. A flux of claim 6 wherein the flux further comprises abietic acid or abietic acid derivatives.

15. A soldering paste comprising the flux of claim 6 and soldering particles.

16. The soldering paste of claim 15 wherein the soldering particles are selected from the group consisting of tin-lead alloys, silver-tin-lead alloys, bismuth-tin-lead alloys, gold-tin-lead alloys and iridium-tin-lead alloys.

17. The flux of claim 7, wherein the molar ratio of COOH groups in the organic acid or in the organic acid salt to the NCO groups in the blocked isocyanate, COOH:NCO, is suitable to effectively prevent the corrosion of a metallic base.

18. The flux of claim 9, wherein the equivalent ratio of COOH groups in the organic acid or in the organic acid salt to the polyvalent metals of the polyvalent metal compound, COOH: equivalent of metal, is suitable to effectively prevent corrosion of a metallic base.

19. The flux of claim 11, wherein the molar ratio of COOH groups in the organic acid or in the organic acid salt to the epoxy groups in the epoxy resin, COOH:epoxy group, is suitable to effectively prevent corrosion of a metallic base.

20. A method for soldering a part to a metal base which comprises effecting the soldering in the presence of the soldering paste of claim 15.

* * * * *